United States Patent
Winkler et al.

(10) Patent No.: US 10,523,035 B2
(45) Date of Patent: Dec. 31, 2019

(54) MULTI-TAPPED COIL FOR WIRELESS CHARGING RANGE AND EFFICIENCY

(71) Applicant: MOTOROLA MOBILITY LLC, Chicago, IL (US)

(72) Inventors: David Winkler, Aurora, IL (US); Britton Baugher, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 463 days.

(21) Appl. No.: 15/206,854

(22) Filed: Jul. 11, 2016

(65) Prior Publication Data
US 2018/0013309 A1 Jan. 11, 2018

(51) Int. Cl.
*H02J 7/02* (2016.01)
*H02J 50/10* (2016.01)
*H02J 50/80* (2016.01)

(52) U.S. Cl.
CPC .............. *H02J 7/025* (2013.01); *H02J 50/10* (2016.02); *H02J 50/80* (2016.02)

(58) Field of Classification Search
CPC ............. H02J 7/025; H02J 50/10; H02J 50/80
USPC .......................................... 307/104; 320/108
See application file for complete search history.

(56) References Cited

U.S. PATENT DOCUMENTS

2016/0118811 A1* 4/2016 Eguchi ................ B60L 11/1848
307/104

OTHER PUBLICATIONS

Johns, Bill, et al., "Adapting Qi-compliant wireless-power solutions to low-power wearable products", Analog Applications Journal; Available: www.ti.com/aaj (2Q, 2014).
Johns, Bill, et al., "Designing a Qi-compliant receiver coil for wireless power systems, Part 1", Analog Applications Journal; Available: www.ti.com/aaj (3Q 2012).
Freescale Semiconductor, Inc., "Coils Used for Wireless Charging", Document No. AN4866, Rev. 0, Jan. 2014.

* cited by examiner

*Primary Examiner* — Hal Kaplan
(74) *Attorney, Agent, or Firm* — Yudell Isidore PLLC

(57) ABSTRACT

A method, a portable electronic device and a wireless charging system enables a load to be charged by selectively using a detection circuit configuration and a power receiving circuit configuration. A controller is coupled within a wireless power receiver (i) to a sensing circuit having a multi-tapped coil and (ii) to a rectifier that is coupled to the sensing circuit and removably coupled to a load. The controller detects, at an output of the rectifier, a first signal corresponding to an externally transmitted signal that is magnetically coupled to the multi-tapped coil while the sensing circuit is in the detection circuit configuration. In response to detecting the first signal, the controller switches from the detection circuit configuration to the power receiving circuit configuration. The controller then connects the load to the output of the rectifier in order to deliver power to the load.

20 Claims, 8 Drawing Sheets

MULTI-TAPPED COIL FOR WIRELESS CHARGING RANGE AND EFFICIENCY

BACKGROUND

1. Technical Field

The present disclosure generally relates to electronic devices and in particular to wireless charging of portable electronic devices.

2. Description of the Related Art

With an ever increasing demand for smart portable devices to be used for various applications, there is an accompanying increase in the development of low-power portable/mobile devices, including wearable devices such as smart watches and fitness bands. These devices are typically smaller devices which utilize smaller connectors such as a micro-USB type connector to charge the device. However, the micro-USB type connector is too large for charging some of the smaller devices. Wireless charging is a solution to the large connector problem. The Wireless Power Consortium (WPC) has established the Qi standard (i.e., inductive power standard) which can be used in lower power device applications. Wireless charging involves utilizing transmitter and receiver coils to provide a power transfer.

In wireless charging systems, there is an inherent power dissipation tradeoff between the large inductance needed for signal detection and a lower inductance that is optimal for power transfer in Qi compliant wireless power receivers. Current solutions require a designer to pick a receiver inductance that is a balance between detection range and power transfer efficiency. If the trade off of detection range for a wider power transfer operating range is too great, a situation can be presented in which a user can start charging and not be able to restart the device. This leads to a poor charge experience where the device charges completely (i.e., 100% charge) but then the charger shuts off and the device becomes discharged.

Additionally with the introduction of the new medium power Qi 1.2 standard, picking an optimal inductance value will be even more difficult as the low power standard specifies 5 Watts (W) delivered, while the new medium power goes to 15 W.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
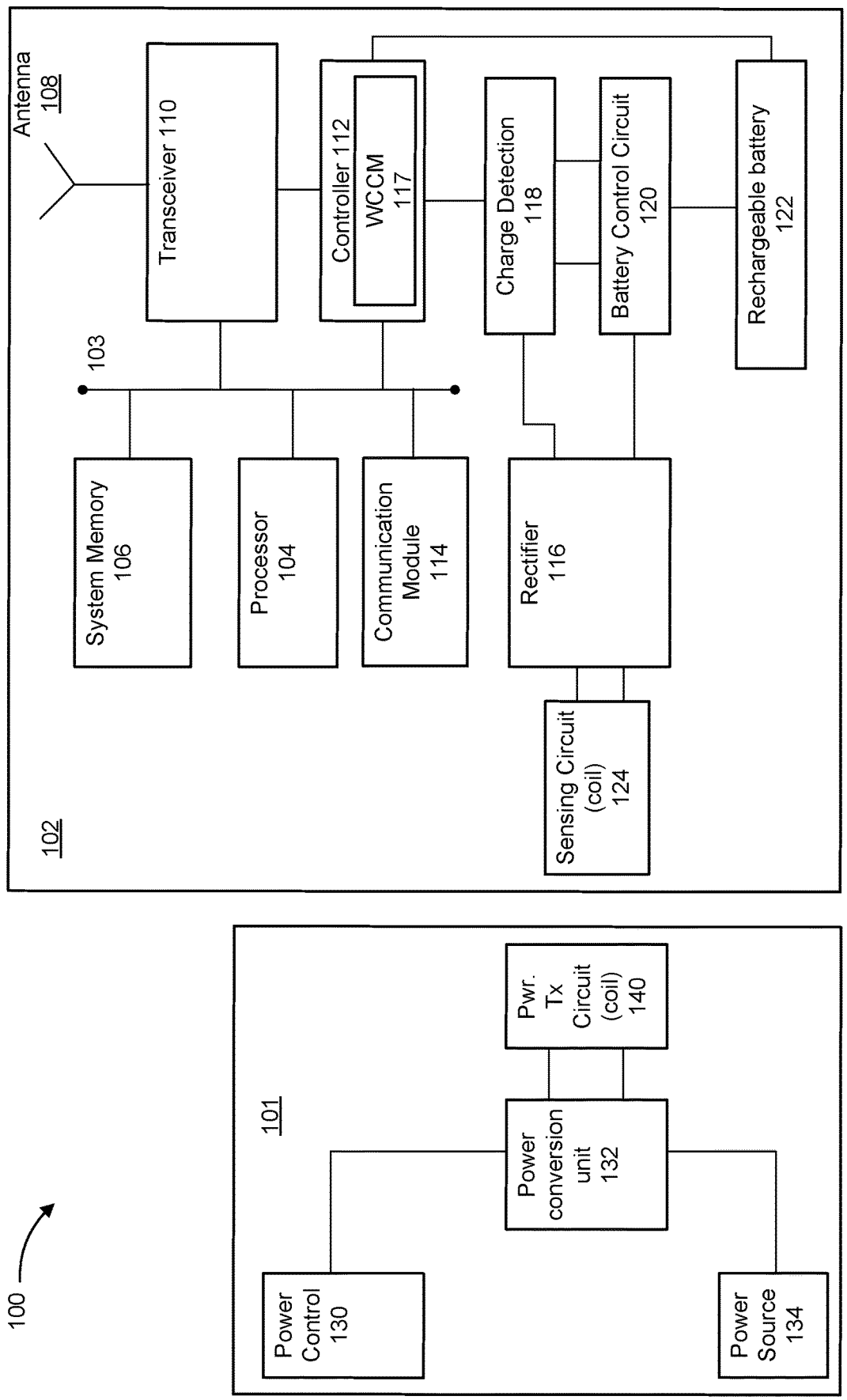
FIG. 1 illustrates a wireless charging system having a transmitter circuitry and a receiver circuitry, within which various aspects of the disclosure can be implemented, according to one or more embodiments.

The illustrative embodiments provide a method, a portable electronic device and a wireless charging system for charging a load by selectively using a detection circuit configuration and a power receiving circuit configuration. A controller is coupled within a wireless power receiver (i) to a sensing circuit having a multi-tapped coil and (ii) to a rectifier that is coupled to the sensing circuit and removably coupled to a load. The controller detects, at an output of the rectifier, a first signal corresponding to an externally transmitted signal that is magnetically coupled to the multi-tapped coil. The controller detects the first signal while the sensing circuit is in the detection circuit configuration. In response to detecting the first signal, the controller switches from the detection circuit configuration to the power receiving circuit configuration. The controller then connects the load to the output of the rectifier in order to deliver power to the load.

The above description contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the electronic device are not intended to be exhaustive, but rather are representative to highlight some of the components that are utilized to implement certain of the described embodiments. For example, different configurations of an electronic device may be provided, containing other devices/components, which may be used in addition to, or in place of, the hardware depicted, and may be differently configured. The depicted example is not meant to imply architectural or other limitations with respect to the presently described embodiments and/or the general invention.

FIG. 1 illustrates a block diagram representation of an example wireless charging system (WCS) 100, within which one or more of the described features of the various embodiments of the disclosure can be implemented. WCS 100 comprises transmitter circuitry 101 and receiver circuitry 102. Transmitter circuitry 101 comprises power conversion unit 132 and power control circuit 130, which is coupled to power conversion unit 132. In one or more embodiments, transmitter circuitry 101 represents a wireless charger. Transmitter circuitry 101 also comprises power source 134, which is coupled to power conversion unit 132. Additionally, transmitter circuitry 101 comprises power transmitter circuit (coil) 140, which is coupled to power conversion unit 132.

Receiver circuitry 102 includes one or more processor(s) 104 coupled to system memory 106 via system interconnect 103. System interconnect 103 can be interchangeably referred to as a system bus, in one or more embodiments. Also coupled to system interconnect 103 is communication module 114. In one or more embodiments, communication module 114 enables and/or provides support for Bluetooth communications and/or near field communications (NFC). Receiver circuitry 102 also includes transceiver 110 and controller 112, which is coupled to transceiver 110. In addition, receiver circuitry 102 includes rectifier 116. As illustrated, controller 112 comprises wireless charging configuration module (WCCM) 117, which controller 112 executes to support and/or provide the disclosed functions of receiver circuitry 102. As illustrated, transceiver 110 is coupled to antenna 108. Receiver circuitry 102 also comprises charge detection circuit 118, which is coupled to controller 112, and battery control circuit 120. As illustrated, receiver circuitry 102 includes a load provided by rechargeable battery 122. Additionally, receiver circuitry 102 comprises sensing circuit (coil) 124 which is coupled to rectifier 116. In one or more embodiments, receiver circuitry 102 represents a portable, mobile and/or wearable electronic device. For example, the electronic device is a cell phone/smart-phone, a smart watch, a pair of headphones, etc.

According to one or more aspects, wireless power charging system 100 includes a wireless power transmitter (e.g., transmitter circuitry 101) comprising power conversion unit 132 that receives external power from an alternating current (AC) source (e.g., power source 134). Wireless power charging system 100 also comprises a coil 140, communicatively coupled to power conversion unit 132, and power control unit 130, communicatively coupled to power conversion unit 132 and to coil 140. Power control unit 130 triggers power conversion unit 132 to provide a signal that is transmitted via coil 140. In addition, power control unit 130 is configured to adjust a signal level of the transmitted signal by a requested amount in response to receiving a corresponding request from a wireless power receiver.

Wireless power charging system 100 also includes a wireless power receiver (e.g., receiver circuitry 102) having (i) a sensing circuit 124 comprising a multi-tapped coil (e.g., coil 303 of FIG. 3), (ii) a rectifier 116 coupled to the multi-tapped coil and having an output that is removably coupled to a load (e.g., re-chargeable battery 122), and (iii) a controller 112 coupled to sensing circuit 124 and rectifier 116. Sensing circuit 124 is selectively configurable to be one of a detection circuit configuration and a power receiving circuit configuration.

Controller 112 detects, at an output of rectifier 116, a first signal corresponding to an externally transmitted signal (i.e., the signal transmitter via coil 140) that is magnetically coupled to the multi-tapped coil. More specifically, controller 112 detects the first signal via magnet coupling between coil 140 and the multi-tapped coil (e.g., coil 303 of FIG. 3). Controller 112 detects the first signal using the sensing circuit while the sensing circuit is in the detection circuit configuration. In response to detection of the first signal, controller 112 switches the sensing circuit from the detection circuit configuration to the power receiving circuit configuration and connects the load to the output of the rectifier in order to deliver power to the load. The power receiving circuit configuration is utilized for delivering power to the load.

In one or more implementations, the load is a battery charging circuit. In related implementations, the transmitter is a wireless power transmitter located in an external base connected in a fixed position to an alternating current (AC) supply.

Figure 2:
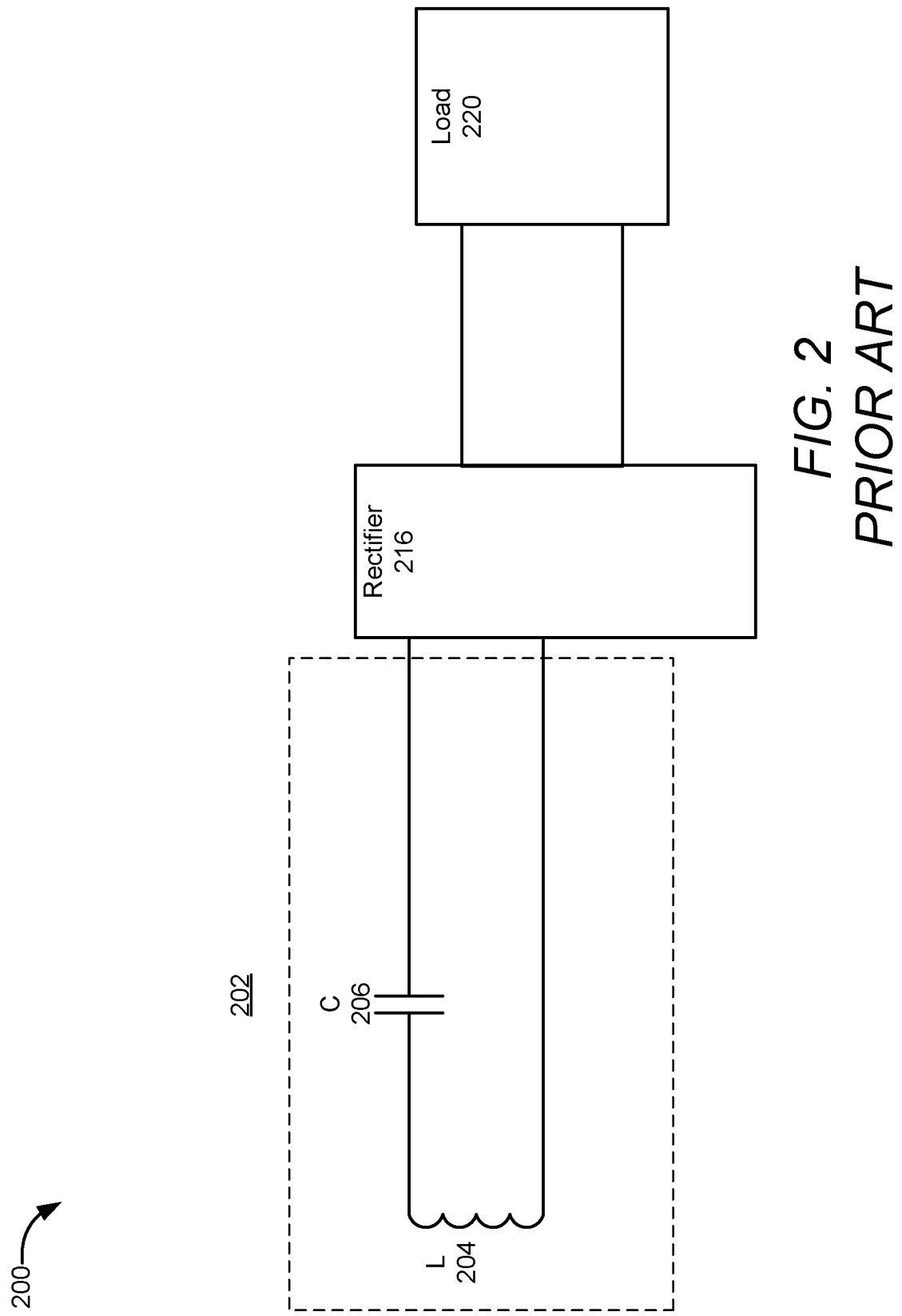
FIG. 2 is a block diagram illustration of a conventional wireless charging receiver configuration, according to the prior art.

FIG. 2 is a block diagram illustration of a conventional wireless charging receiver configuration, according to the prior art. Wireless receiver 200 comprises (i) sensing circuit 202 having an inductor/coil "L" 204, and (ii) rectifier 216 coupled to coil 204 and which has an output that is coupled to load 220. Sensing circuit 202 also comprises a capacitor "C" 206 which is coupled to L 204 and to rectifier 216.

L 204 is selected to provide a receiver inductance that offers a balance between detection range and power transfer efficiency. As previously described, with a trade-off of detection range for a wider power transfer operating range, a situation can be presented in which a user can start charging and not be able to restart the device as a result of the transmitter/charger being shut-off after initially charging the device. As a result of a shut-off state, the transmitter is unable to provide device re-charging as the device begins to discharge.

Figure 3:
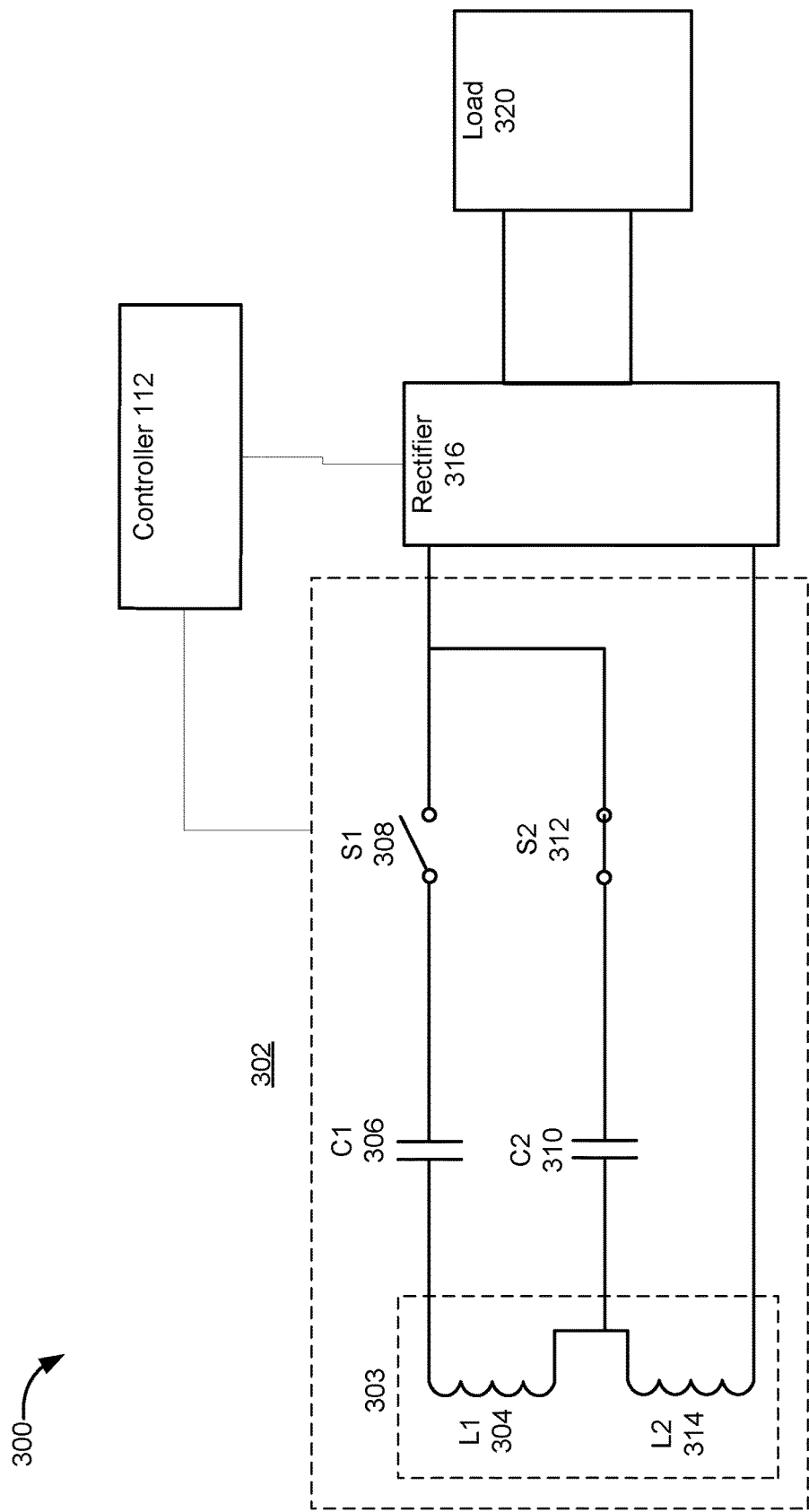
FIG. 3 is a block diagram illustration of a first wireless charging receiver configuration, according to one or more embodiments.

FIG. 3 is a block diagram illustration of a first wireless charging receiver configuration, according to one or more embodiments. Wireless power receiver 300 comprises (i) sensing circuit 302 which includes multi-tapped coil 303, (ii) rectifier 316 coupled to multi-tapped coil 303 and having an output that is removably coupled to load 320 and (iii) controller 112 coupled to sensing circuit 302 and rectifier 316. Sensing circuit 302 is selectively configurable to be one of a detection circuit configuration and a power receiving circuit configuration.

Multi-tapped coil 303, within sensing circuit 302, further comprises first inductor "L1" 304 and second inductor "L2" 314 that is coupled between first inductor 304 and a first input of rectifier 316. Sensing circuit 302 also comprises first capacitor "C1" 306 coupled to first inductor 304, first switch "S1" 308 coupled between first capacitor 306 and a second input of rectifier 316. Sensing circuit 302 further comprises second capacitor "C2" 310 and second switch "S2" 312 coupled between second capacitor 310 and the second input of rectifier 316. In addition, second capacitor 310 is coupled to a node between first inductor 304 and second inductor 314. Controller 112 opens first switch 308, while contemporaneously closing second switch 312, to provide a first switch state. The first switch state enables sensing circuit 302 to be configured in a corresponding detection circuit configuration to support an active signal detection phase during which an externally transmitted signal is detected. As illustrated, sensing circuit 302 is configured to be in a detection circuit configuration. Alternatively, controller 112 closes first switch 308 while contemporaneously opening second switch 312 to provide a second switch state. The second switch state enables sensing circuit 302 to be configured in a corresponding power receiving circuit configuration (e.g., sensing circuit 402 of FIG. 4) to support an active power delivery phase during which power is delivered to load 320.

During operation, controller 112 detects, at an output of rectifier 316, a first signal corresponding to an externally transmitted signal propagated by the transmitter/coil 140 (FIG. 1) that is magnetically coupled to multi-tapped coil 303. Controller 112 detects the first signal using the sensing circuit while the sensing circuit is in the detection circuit configuration. In response to detecting the first signal, controller 112 determines whether a first signal level of the detected first signal is greater than a threshold value. In response to detecting that the first signal level is greater than the threshold level, controller 112 forwards a first request, via multi-tapped coil 303, to an externally-located transmitter which corresponds to the detected first signal. Controller 112 forwards the first request, using communication circuitry coupled to or located within the controller 112, to instruct the transmitter (e.g., transmitter circuitry 101) to maintain a transmission level of a signal corresponding to the detected first signal. In addition, controller 112 transmits a first notification message to the transmitter indicating the detected first signal level and a target power signal threshold. The first notification message triggers the transmitter to perform an adjustment of a transmitted signal level if the detected first signal level is less than the target power receiving level. Additionally, controller 112 triggers the switching of sensing circuit 302 from the detection circuit configuration to the power receiving circuit configuration. Controller 112 then connects load 320 to the output of rectifier 316 in order to deliver power to load 320.

According to one or more aspects, controller 112 detects, at the output of rectifier 316, a second signal corresponding to the externally transmitted signal which was propagated by tra. Controller 112 detects the second signal using the sensing circuit while the sensing circuit is in the power receiving circuit configuration. Controller 112 determines whether a second signal level of the detected second signal is less than a target power signal threshold. In response to detecting that the second signal level is less than the target power signal threshold, controller 112 transmits a second notification message to the transmitter indicating a compensated signal level. Controller 112 determines the compensated signal level by applying an adjustment to the detected second signal level to compensate for switching to the power receiving circuit configuration. In response to detecting that the second signal level is not less than the target power signal threshold, controller 112 instructs the transmitter to maintain a transmission signal level of the externally transmitted signal.

According to one or more aspects, controller 112 determines a difference between a first net inductance for the detection circuit configuration and a second net inductance for the power receiving circuit configuration. Controller 112 then determines the compensated signal level corresponding to the detected second signal by adjusting a value of the detected second signal level using a ratio of (i) the determined difference between first and second net inductances and (ii) a net inductance for the detection circuit configuration. Within the second notification message to the transmitter, controller 112 provides the compensated signal level and the target power signal threshold. Controller 112 provides the second notification message which triggers the transmitter to increase the transmission signal level by an amount corresponding to a difference between the compensated signal level and the target power signal threshold.

According to one or more aspects, a first operating frequency of the detection circuit configuration is based on a product of (i) a capacitance value of the first capacitor and (ii) a sum of inductance values of the first and second inductors. A second operating frequency of the power receiving circuit configuration is based on a product of (i) a capacitance value of the second capacitor and (ii) an inductance value of the second inductor.

According to one or more aspects, sensing circuit 302 includes a switching circuit comprised of switches 308 and 312 that enables the sensing circuit to be configurable in one of the detection circuit configuration and the power receiving circuit configuration.

Figure 4:
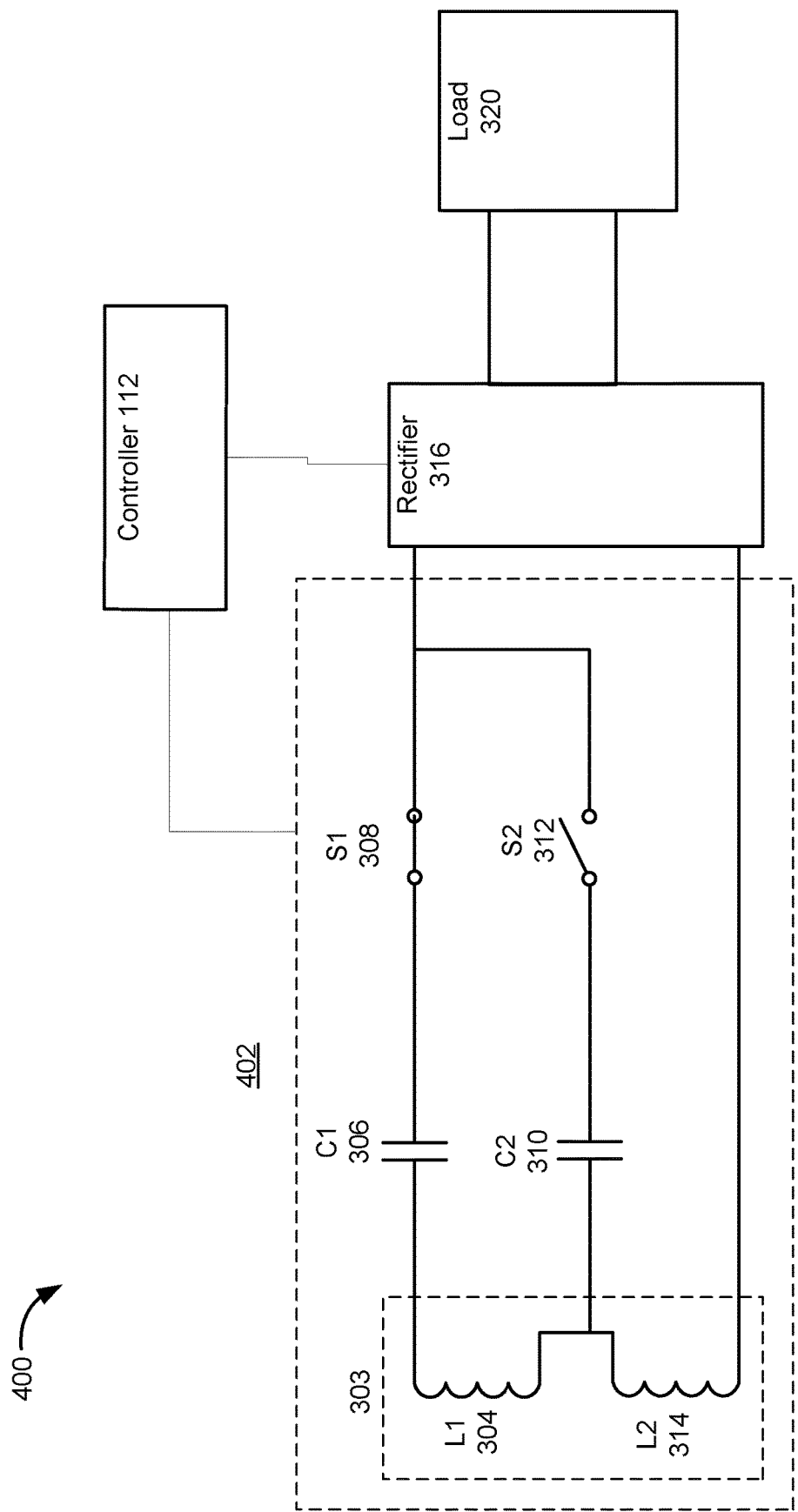
FIG. 4 is a block diagram illustration of the first wireless charging receiver configuration configured for charging via a power receiving circuit configuration, according to one or more embodiments.

FIG. 4 is a block diagram illustration of the first wireless charging receiver configuration configured for charging via a power receiving circuit configuration, according to one or more embodiments. Wireless power receiver 400 includes a somewhat identical architecture to wireless power receiver 300. However, wireless power receiver 400 includes sensing circuit 402, which is specifically configured in the power receiving circuit configuration. In particular, controller 112 closes first switch 308 while contemporaneously opening second switch 312 to provide a second switch state. The second switch state enables sensing circuit 402 to be configured in a corresponding power receiving circuit configuration to support an active power delivery phase during which power is delivered to load 320.

Figure 5:
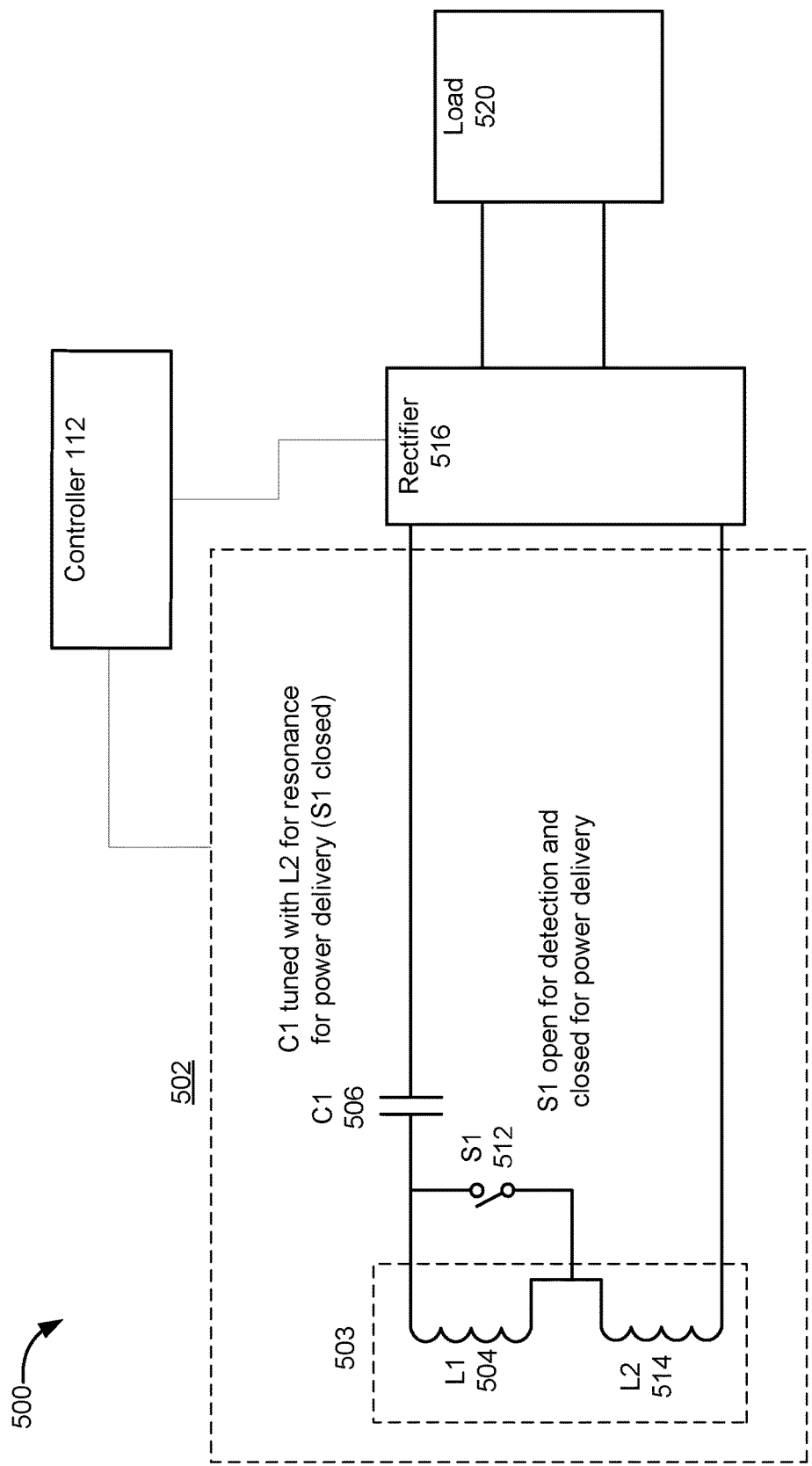
FIG. 5 is a block diagram illustration of a second wireless charging receiver configuration, according to one or more embodiments.

FIG. 5 is a block diagram illustration of a second wireless charging receiver configuration, according to one or more embodiments. Wireless power receiver 500 includes (i) sensing circuit 502 which includes multi-tapped coil 503, (ii) rectifier 516 coupled to multi-tapped coil 503 and having an output that is removably coupled to load 520 and (iii) controller 112 coupled to sensing circuit 502 and rectifier 516. Sensing circuit 502 is selectively configurable to be one of a detection circuit configuration and a power receiving circuit configuration.

According to one or more aspects, in sensing circuit 502, multi-tapped coil 503 also includes first inductor "L1" 504 and second inductor "L2" 514, which is coupled between first inductor 504 and a first input of rectifier 516. Sensing circuit 502 also includes first capacitor "C1" 506 coupled between first inductor 504 and a second input of rectifier 516, and first switch "S1" 512 coupled in parallel with first inductor 504. Controller 112 opens first switch 512 to provide a first switch state and a corresponding detection circuit configuration, and controller 112 closes first switch 512 to provide a second switch state and a corresponding power receiving circuit configuration.

In the power receiving circuit configuration used for power delivery, first capacitor 506 is tuned for resonance with second inductor 514. As illustrated, sensing circuit 502 utilizes a single switch and a single resonant capacitor. In addition, power losses are lower in the detection mode as there is no switch in series with any other components of sensing circuit 502.

Figure 6:
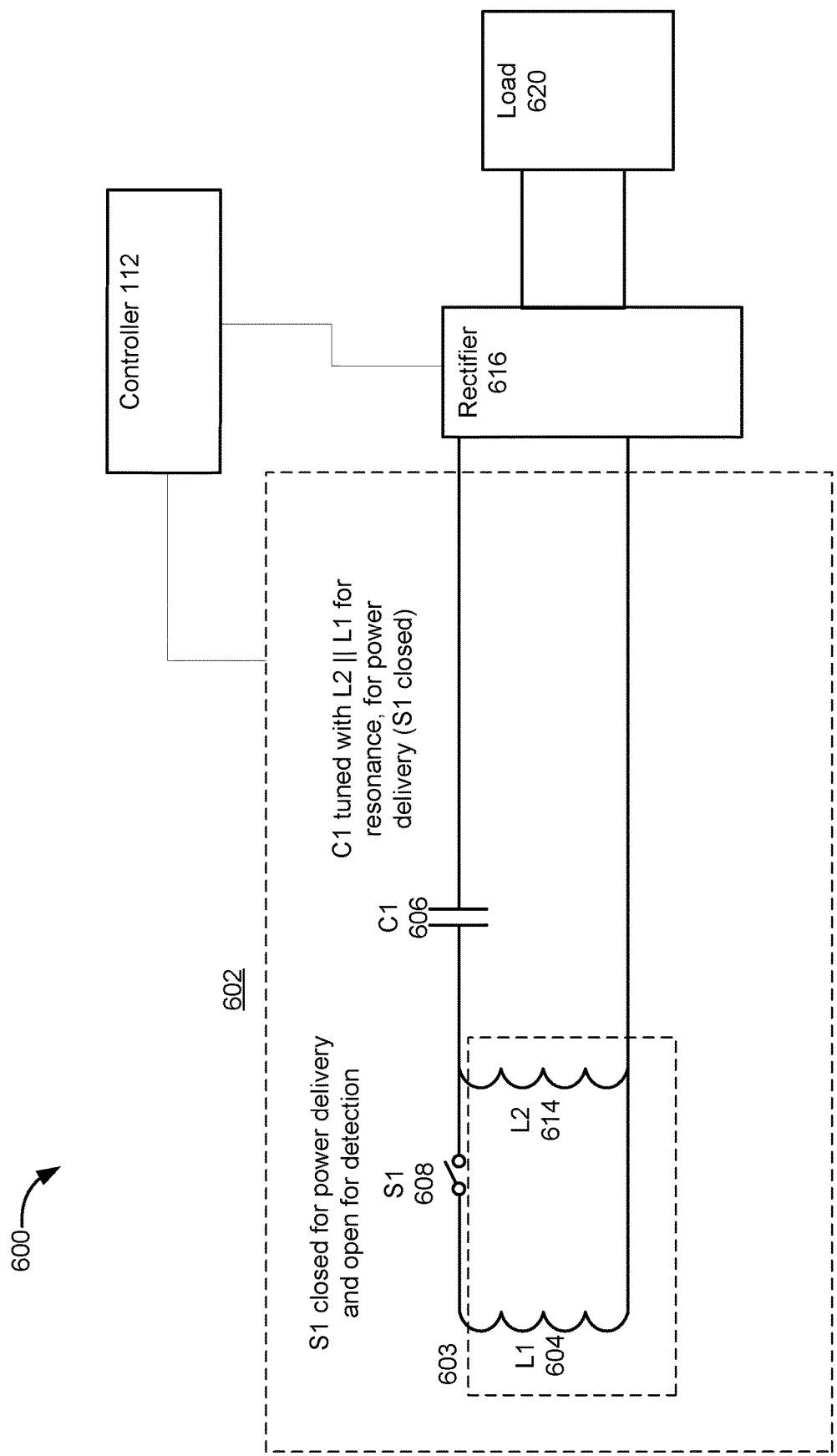
FIG. 6 is a block diagram illustration of a third wireless charging receiver configuration, according to one or more embodiments.

FIG. 6 is a block diagram illustration of a third wireless charging receiver configuration, according to one or more embodiments. Wireless power receiver 600 includes (i) sensing circuit 602 which includes multi-tapped coil 603, (ii) rectifier 616 coupled to multi-tapped coil 603 and having an output that is removably coupled to load 620 and (iii) controller 112 coupled to sensing circuit 602 and rectifier 616. Sensing circuit 602 is selectively configurable to be one of a detection circuit configuration and a power receiving circuit configuration.

According to one or more aspects, in sensing circuit 602, multi-tapped coil 603 also includes first inductor "L1" 604 and second inductor "L2" 614 coupled to a first input of rectifier 616. Sensing circuit 602 also includes first capacitor "C1" 606 coupled between second inductor 614 and a second input of rectifier 616, and first switch "S1" 608 coupled in series with first inductor 604. Second inductor 614 is coupled in parallel with the series coupling of first inductor 604 and first switch 608. Controller 112 opens first switch 608 to provide a first switch state and a corresponding detection circuit configuration, and controller 112 closes first switch 608 to provide a second switch state and a corresponding power receiving circuit configuration.

In the power receiving circuit configuration used for power delivery, first capacitor 606 is tuned for resonance with a parallel combination of second inductor 614 and first inductor 604. As illustrated, sensing circuit 602 utilizes a single switch and a single resonant capacitor. In addition, power losses are even lower in the detection mode as there is no (closed) switch in series with any other components of sensing circuit 602. Furthermore, the first and second inductors 604 and 614 share current, so lower losses occur with an equivalent conductor size.

Figure 7:
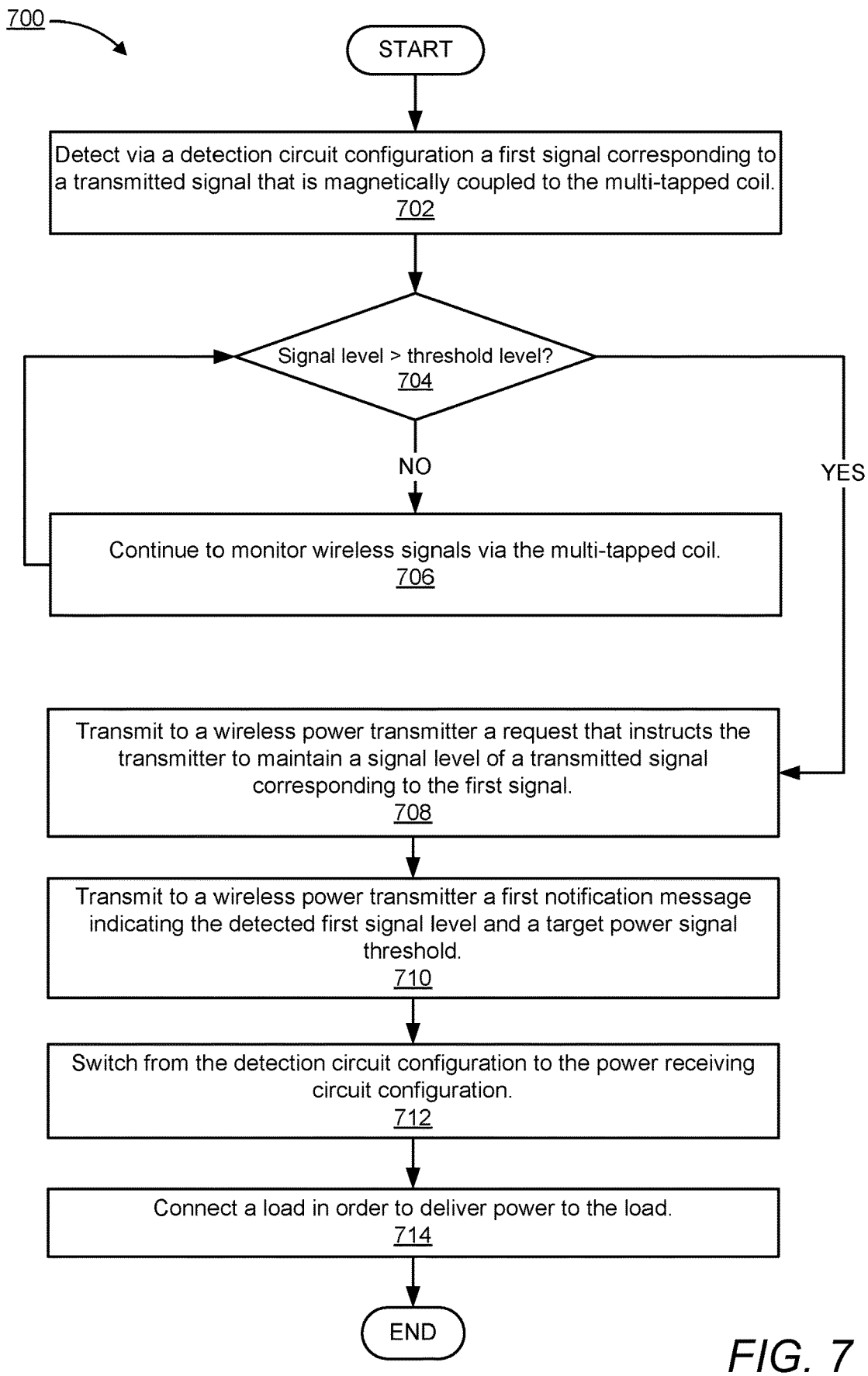
FIG. 7 is a flow chart illustrating a method for charging a load by selectively using a detection circuit configuration and a power receiving circuit configuration, according to one embodiment.
Figure 8:
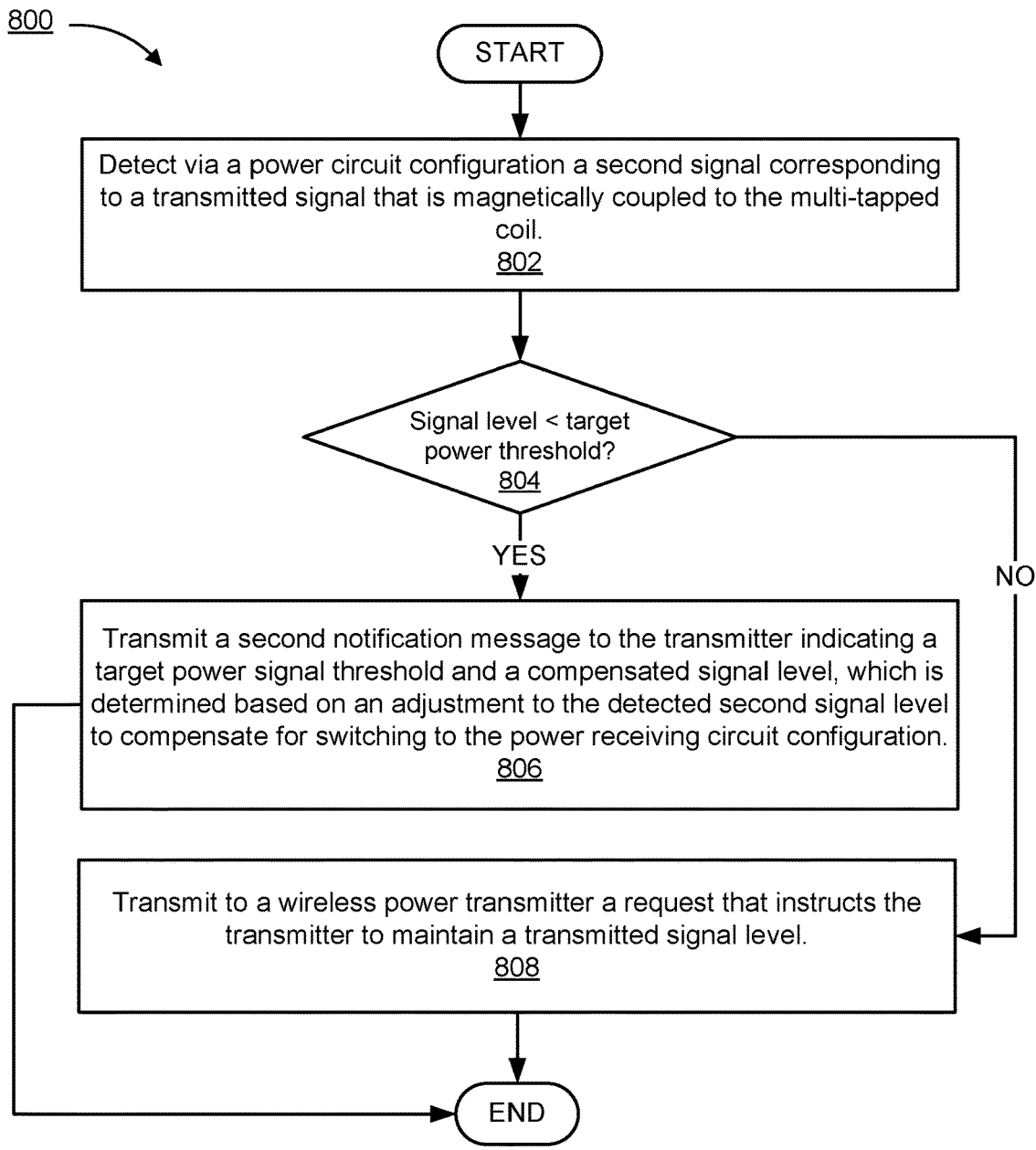
FIG. 8 is a flow chart illustrating a method for optimizing a power charging signal level by providing a signal level feedback to the power transmitter, according to one embodiment.

FIGS. 7 and 8 present flowcharts illustrating example methods by which electronic device 100, and specifically controller 112 and wireless charging configuration module (WCCM) 117 presented within the preceding figures, perform different aspects of the processes that enable one or more embodiments of the disclosure. Method 700 represents a method for charging a load by selectively using a detection circuit configuration and a power receiving circuit configuration. Method 800 represents a method for optimizing a power charging signal level by providing a signal level feedback (or adjustment request) to the power transmitter. The description of each method is provided with general reference to the specific components illustrated within the preceding figures. It is appreciated that certain aspects of the described methods may be implemented via other processing devices and/or execution of other code/firmware. In the discussion of FIGS. 7 and 8, reference is also made to elements described in FIGS. 1 and 3-6.

Method 700 begins at the start block and proceeds to block 702 at which controller 112/WCCM 117 detects, at an output of the rectifier, a first signal corresponding to an externally transmitted signal that is magnetically coupled to the multi-tapped coil. Controller 112 detects the first signal using the sensing circuit while the sensing circuit is in the detection circuit configuration. Controller 112 determines whether the detected signal level is greater than the threshold level (decision block 704). If the detected signal level is not greater than the threshold level, controller 112 continues to monitor wireless signals via the multi-tapped coil (block 706). However, if the detected signal level is greater than the threshold level, controller 112 transmits a request to a wireless power transmitter that instructs the transmitter to maintain a signal level of a transmitted signal corresponding to the first signal (block 708). Controller 112 then transmits a first notification message to a wireless power transmitter indicating the detected first signal level and a target power signal threshold (block 710). Controller 112 switches from the detection circuit configuration to the power receiving circuit configuration (block 712), and connects a load in order to deliver power to the load (block 714). The process concludes at the end block.

Method 800 begins at the start block and proceeds to block 802 at which controller 112 detects, via a power circuit configuration, a second signal corresponding to a transmitted signal that is magnetically coupled to the multi-tapped coil. Controller 112 determines whether a signal level detected at an output of the rectifier is less than a target power threshold value (decision block 804). If the detected signal level is less than the target power threshold value, controller 112 transmits a second notification message to a wireless power transmitter indicating a target power signal threshold and a compensated signal level (block 806). The compensated signal level is determined based on an adjustment to the detected second signal level to compensate for switching to the power receiving circuit configuration. If the detected signal level is not less than the target power threshold value, controller 112 transmits a request to the wireless power transmitter that instructs the transmitter to maintain a transmitted signal level (block 808). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An electronic device comprising:
   a wireless power receiver having (i) a sensing circuit comprising a multi-tapped coil and which is selectively configurable to one of a detection circuit configuration and a power receiving circuit configuration, (ii) a rectifier coupled to the multi-tapped coil and having an output that is removably coupled to a load, and (iii) a controller coupled to the sensing circuit and the rectifier and which:
      detects, at an output of the rectifier, a first signal corresponding to an externally transmitted signal that is magnetically coupled to the multi-tapped coil while the sensing circuit is in the detection circuit configuration;
      in response to detection of the first signal, switches the sensing circuit from the detection circuit configuration to the power receiving circuit configuration, which is used for delivering power to the load; and
      connects the load to the output of the rectifier in order to deliver power to the load.

2. The electronic device of claim 1, wherein the controller:
   determines whether a first signal level of the detected first signal is greater than a threshold level;
   in response to detecting that the first signal level is greater than the threshold level: forwards via the multi-tapped coil a first request to an externally-located transmitter corresponding to the detected first signal, using communication circuitry within the controller, to instruct the transmitter to maintain a transmission of a signal corresponding to the detected first signal;
   transmits a first notification message to the transmitter indicating the detected first signal level and a first target power signal threshold, wherein said first notification message triggers the transmitter to perform an adjustment of a transmitted signal level if the detected first signal level is less than the first target power signal threshold; and triggers said switching from the detection circuit configuration to the power receiving circuit configuration.

3. The electronic device of claim 1, wherein the controller:
- detects, at the output of the rectifier, a second signal corresponding to the externally transmitted signal while the sensing circuit is in the power receiving circuit configuration;
- determines whether a second signal level of the detected second signal is less than a second target power signal threshold;
- in response to detecting that the second signal level is less than the second target power signal threshold, transmits a second notification message to a transmitter indicating a compensated signal level, which is determined based on an adjustment to the detected second signal level to compensate for said switching to the power receiving circuit configuration; and
- in response to detecting that the second signal level is not less than the second target power signal threshold, instructs the transmitter to maintain a transmission signal level of the transmitted signal.

4. The electronic device of claim 3, wherein the controller:
- determines a difference between a first net inductance for the detection circuit configuration and a second net inductance for the power receiving circuit configuration;
- determines the compensated signal level corresponding to the detected second signal by adjusting a value of the detected second signal level using a ratio of (i) the determined difference and (ii) a net inductance for the detection circuit configuration; and
- provides within the second notification message to the transmitter said compensated signal level and the second target power signal threshold, wherein said second notification message triggers the transmitter to increase the transmission signal level by an amount corresponding to a difference between the compensated signal level and the second target power signal threshold.

5. The electronic device of claim 1, wherein:
the multi-tapped coil comprises: a first inductor; and a second inductor that is coupled between the first inductor and a first input of the rectifier;
the sensing circuit comprises:
- a first capacitor coupled to the first inductor;
- a first switch coupled between the first capacitor and a second input of the rectifier;
- a second capacitor; and
- a second switch coupled between the second capacitor and the second input of the rectifier, wherein the second capacitor is coupled to a node between the first inductor and the second inductor; and
the controller:
- opens the first switch while contemporaneously closing the second switch to provide a first switch state and a corresponding detection circuit configuration while a detection phase that enables detection of the externally transmitted signal is active; and
- closes the first switch while contemporaneously opening the second switch to provide a second switch state and a corresponding power receiving circuit configuration while a power delivery phase that enables the delivery of power to the load is active.

6. The electronic device of claim 5, wherein:
a first operating frequency of the detection circuit configuration is based on a product of (i) a capacitance value of the first capacitor and (ii) a sum of inductance values of the first and second inductors; and
a second operating frequency of the power receiving circuit configuration is based on a product of (i) a capacitance value of the second capacitor and (ii) an inductance value of the second inductor.

7. The electronic device of claim 1, wherein:
the multi-tapped coil comprises: a first inductor; and a second inductor that is coupled between the first inductor and a first input of the rectifier;
the sensing circuit comprises:
- a first capacitor coupled between the first inductor and a second input of the rectifier;
- a first switch coupled in parallel with the first inductor; and
wherein the controller:
- opens the first switch to provide a first switch state and a corresponding detection circuit configuration; and
- closes the first switch to provide a second switch state and a corresponding power receiving circuit configuration.

8. The electronic device of claim 1, wherein:
the multi-tapped coil comprises: a first inductor; and a second inductor coupled to a first input of the rectifier;
the sensing circuit comprises:
- a first capacitor coupled between the second inductor and a second input of the rectifier; and
- a first switch coupled in series with the first inductor;
the second inductor is coupled in parallel with the series coupling of said first inductor and said first switch; and
wherein the controller:
- opens the first switch to provide a first switch state and a corresponding detection circuit configuration; and
- closes the first switch to provide a second switch state and a corresponding power receiving circuit configuration.

9. The electronic device of claim 1, wherein the sensing circuit comprises a switching circuit that enables the sensing circuit to be configurable in one of the detection circuit configuration and the power receiving circuit configuration.

10. The electronic device of claim 1, wherein:
the load is a battery charging circuit; and
the transmitter is a wireless power transmitter located in an external base and is connected in a fixed position to an alternating current (AC) supply.

11. In an electronic device having a wireless power receiver, a method comprising:
- detecting a first signal corresponding to an externally transmitted signal, wherein the wireless power receiver comprises a sensing circuit and a rectifier coupled to the sensing circuit, wherein the first signal is detected at an output of the rectifier, wherein the externally transmitted signal is magnetically coupled to a multi-tapped coil of the sensing circuit while the sensing circuit is in a detection circuit configuration;
- in response to detection of the first signal, switching the sensing circuit from the detection circuit configuration to a power receiving circuit configuration which is used for delivering power to a load; and
- connecting the load to the output of the rectifier in order to deliver power to the load.

12. The method of claim 11, further comprising:
- determining whether a first signal level of the detected first signal is greater than a threshold level;
- in response to detecting that the first signal level is greater than the threshold level: forwarding via the multi-tapped coil a first request to an externally-located transmitter corresponding to the detected first signal, using communication circuitry within the controller, to instruct the transmitter to maintain a transmission of a signal corresponding to the detected first signal;

transmitting a first notification message to the transmitter indicating the detected first signal level and a first target power signal threshold, wherein said first notification message triggers the transmitter to perform an adjustment of a transmitted signal level if the detected first signal level is less than the first target power signal threshold; and triggering said switching from the detection circuit configuration to the power receiving circuit configuration.

13. The method of claim 12, wherein said forwarding further comprises:

detecting, at the output of the rectifier, a second signal corresponding to the externally transmitted signal while the sensing circuit is in the power receiving circuit configuration;

determining whether a second signal level of the detected second signal is less than a second target power signal threshold;

in response to detecting that the second signal level is less than the second target power signal threshold, transmitting a second notification message to the transmitter indicating a compensated signal level, which is determined based on an adjustment to the detected second signal level to compensate for said switching to the power receiving circuit configuration; and in response to detecting that the second signal level is not less than the second target power signal threshold, instructing the transmitter to maintain a transmission signal level of the transmitted signal.

14. The method of claim 13, further comprising:

determining a difference between a first net inductance for the detection circuit configuration and a second net inductance for the power receiving circuit configuration;

determining the compensated signal level corresponding to the detected second signal by adjusting a value of the detected second signal level using a ratio of (i) the determined difference and (ii) a net inductance for the detection circuit configuration; and providing within the second notification message to the transmitter said compensated signal level and the second target power signal threshold, wherein said second notification message triggers the transmitter to increase the transmission signal level by an amount corresponding to a difference between the compensated signal level and the second target power signal threshold.

15. The method of claim 11, wherein:

the multi-tapped coil comprises: a first inductor; and a second inductor that is coupled between the first inductor and a first input of the rectifier;

the sensing circuit comprises:
 a first capacitor coupled to the first inductor;
 a first switch coupled between the first capacitor and a second input of the rectifier;
 a second capacitor; and
 a second switch coupled between the second capacitor and the second input of the rectifier, wherein the second capacitor is coupled to a node between the first inductor and the second inductor; and the method further comprises:
 opening the first switch while contemporaneously closing the second switch to provide a first switch state and a corresponding detection circuit configuration while a detection phase that enables detection of the externally transmitted signal is active; and
 closing the first switch while contemporaneously opening the second switch to provide a second switch state and a corresponding power receiving circuit configuration while a power delivery phase that enables the delivery of power to the load is active.

16. The method of claim 15, wherein:

a first operating frequency of the detection circuit configuration is based on a product of (i) a capacitance value of the first capacitor and (ii) a sum of inductance values of the first and second inductors; and a second operating frequency of the power receiving circuit configuration is based on a product of (i) a capacitance value of the second capacitor and (ii) an inductance value of the second inductor.

17. The method of claim 11, wherein:

the load is a battery charging circuit; and the transmitter is a wireless power transmitter located in an external base and is connected in a fixed position to an alternating current (AC) supply.

18. A wireless power charging system comprising:

a wireless power transmitter comprising:
 a power conversion unit that receives external power from an alternating current (AC) source and converts received AC power into a direct current (DC) power signal;
 a coil communicatively coupled to the power conversion unit and which receives an input of the DC power signal; and
 a power control unit coupled to the power conversion unit and which triggers the power conversion unit to provide a specific level of the DC power signal to the coil, wherein in response to receipt of the DC power signal, the coil generates a magnetic field that provides a transmitted signal at a signal level corresponding to the specific level of the DC power signal;
 wherein the power control unit is configured to adjust the signal level of the transmitted signal by a requested amount in response to receiving a corresponding request, from a wireless power receiver.

19. The wireless power charging system of claim 18, further comprising:

a wireless power receiver having (i) a sensing circuit comprising a multi-tapped coil and which is selectively configurable to one of a detection circuit configuration and a power receiving circuit configuration, (ii) a rectifier coupled to the multi-tapped coil and having an output that is removably coupled to a load, and (iii) a controller coupled to the sensing circuit and the rectifier and which:

detects, at an output of the rectifier, a first signal corresponding to an externally transmitted signal that is magnetically coupled to the multi-tapped coil while the sensing circuit is in the detection circuit configuration;

in response to detection of the first signal, switches the sensing circuit from the detection circuit configuration to the power receiving circuit configuration, which is used for delivering power to the load; and connects the load to the output of the rectifier in order to deliver power to the load.

20. The wireless power charging system of claim 19, wherein:

the controller:
- determines whether a first signal level of the detected first signal is greater than a threshold level;
- in response to detecting that the first signal level is greater than the threshold level: forwards via the multi-tapped coil a first request to an externally-located transmitter corresponding to the detected first signal, using communication circuitry within the controller, to instruct the transmitter to maintain a transmission of a signal corresponding to the detected first signal;
- transmits a first notification message to the transmitter indicating the detected first signal level and a target power signal threshold, wherein said first notification message triggers the transmitter to perform an adjustment of a transmitted signal level if the detected first signal level is less than the target power signal threshold; and
- triggers said switching from the detection circuit configuration to the power receiving circuit configuration; and the power control unit adjusts a signal level of the transmitted signal by the requested amount in response to receiving from the wireless power receiver the first request that instructs the power control unit to adjust the transmission signal level by the requested amount.

\* \* \* \* \*